A. D. WELKER.
DRIVE FOR MATCH MACHINES.
APPLICATION FILED JAN. 18, 1915.
1,158,410.
Patented Oct. 26, 1915.
5 SHEETS—SHEET 3
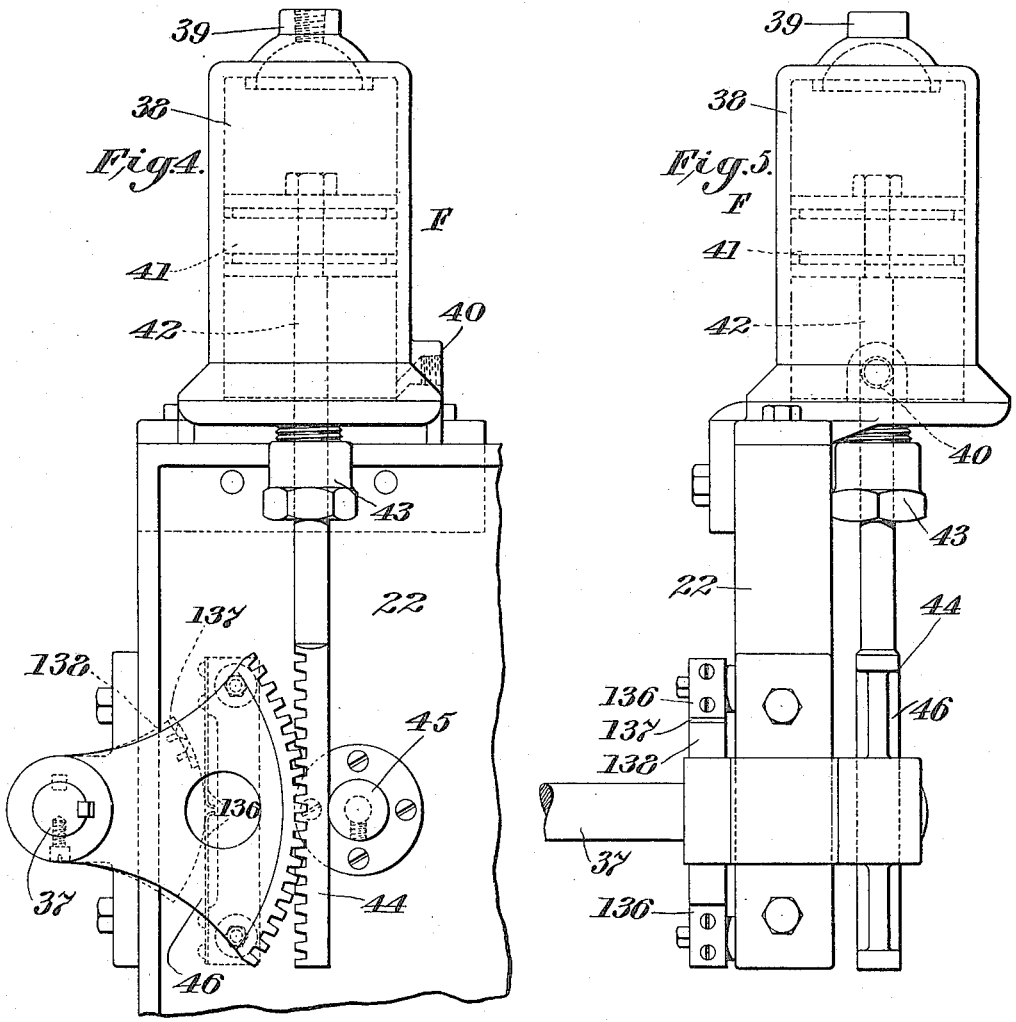
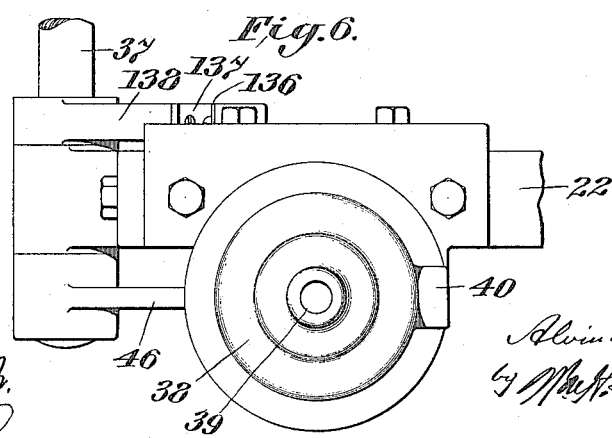

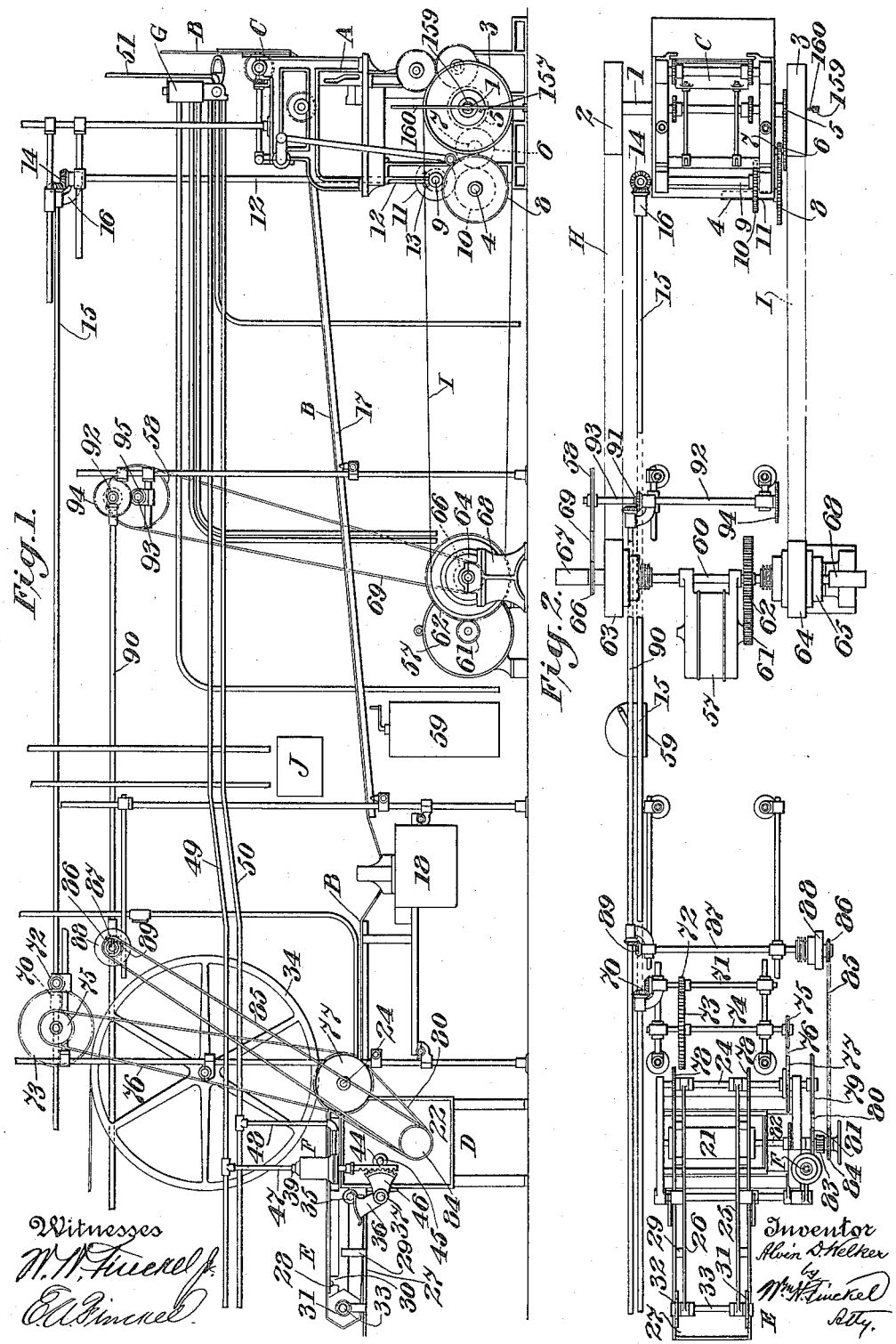

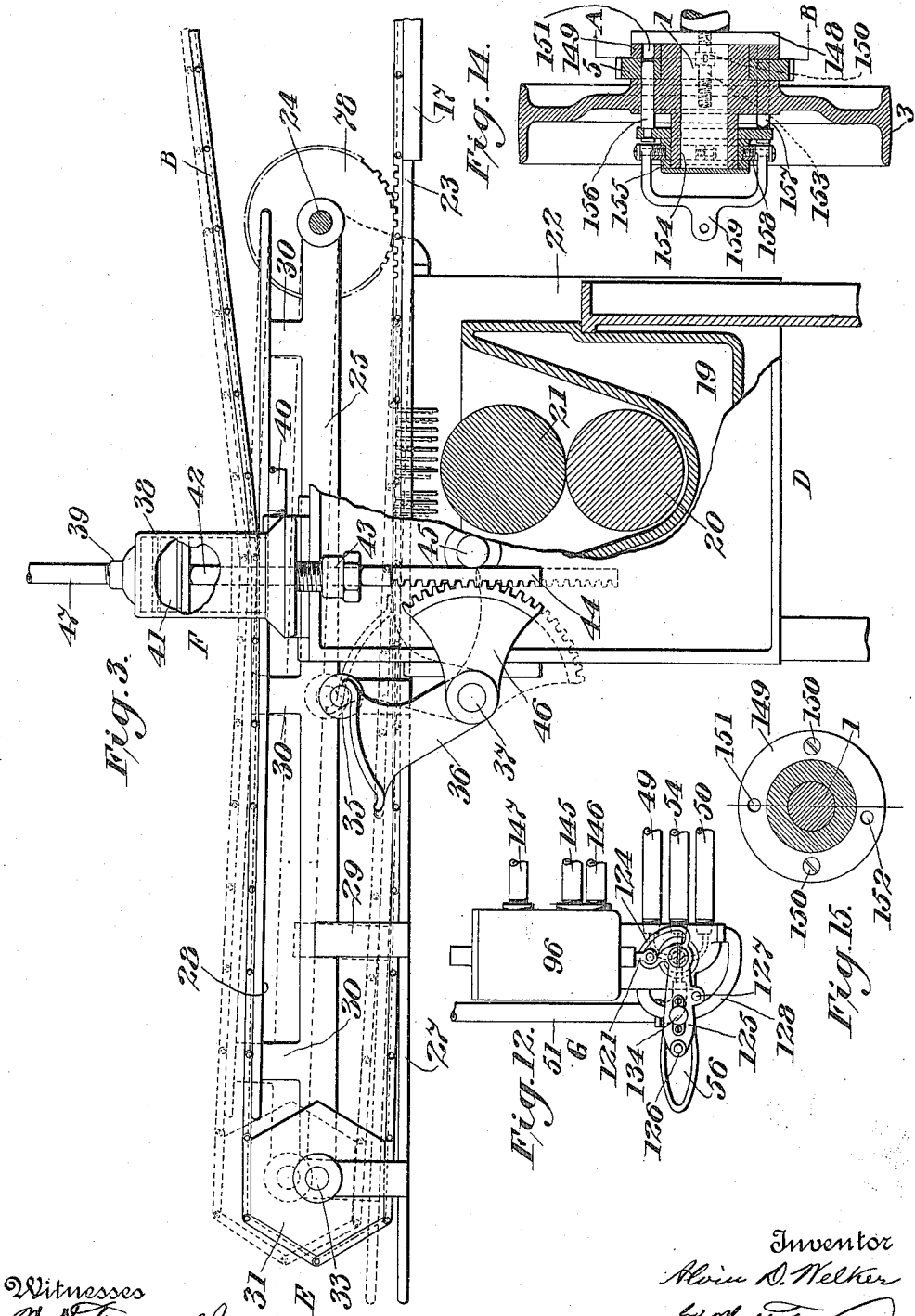

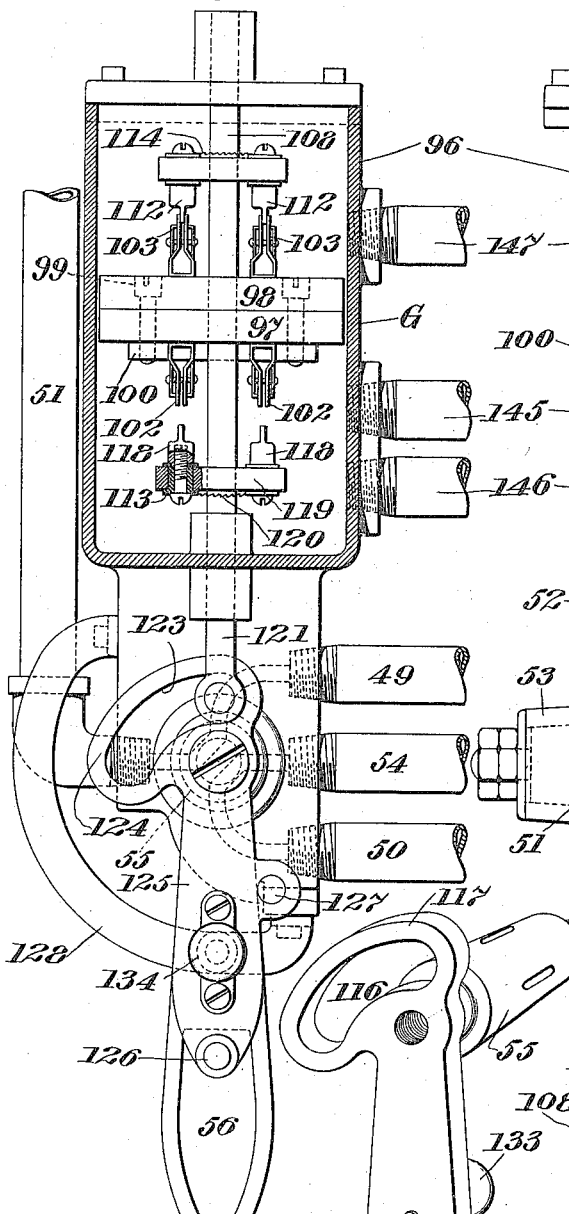
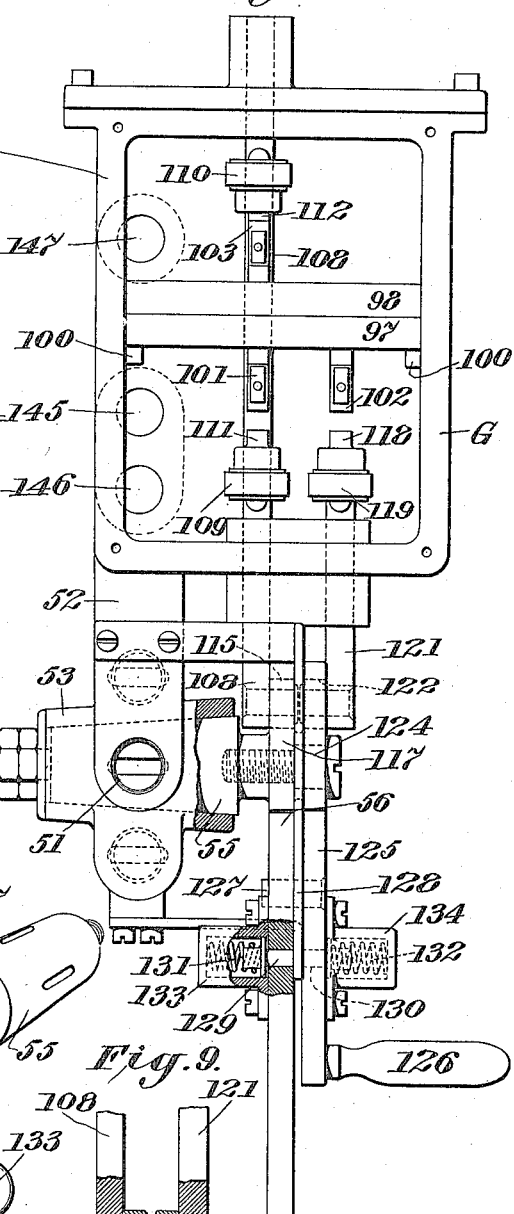

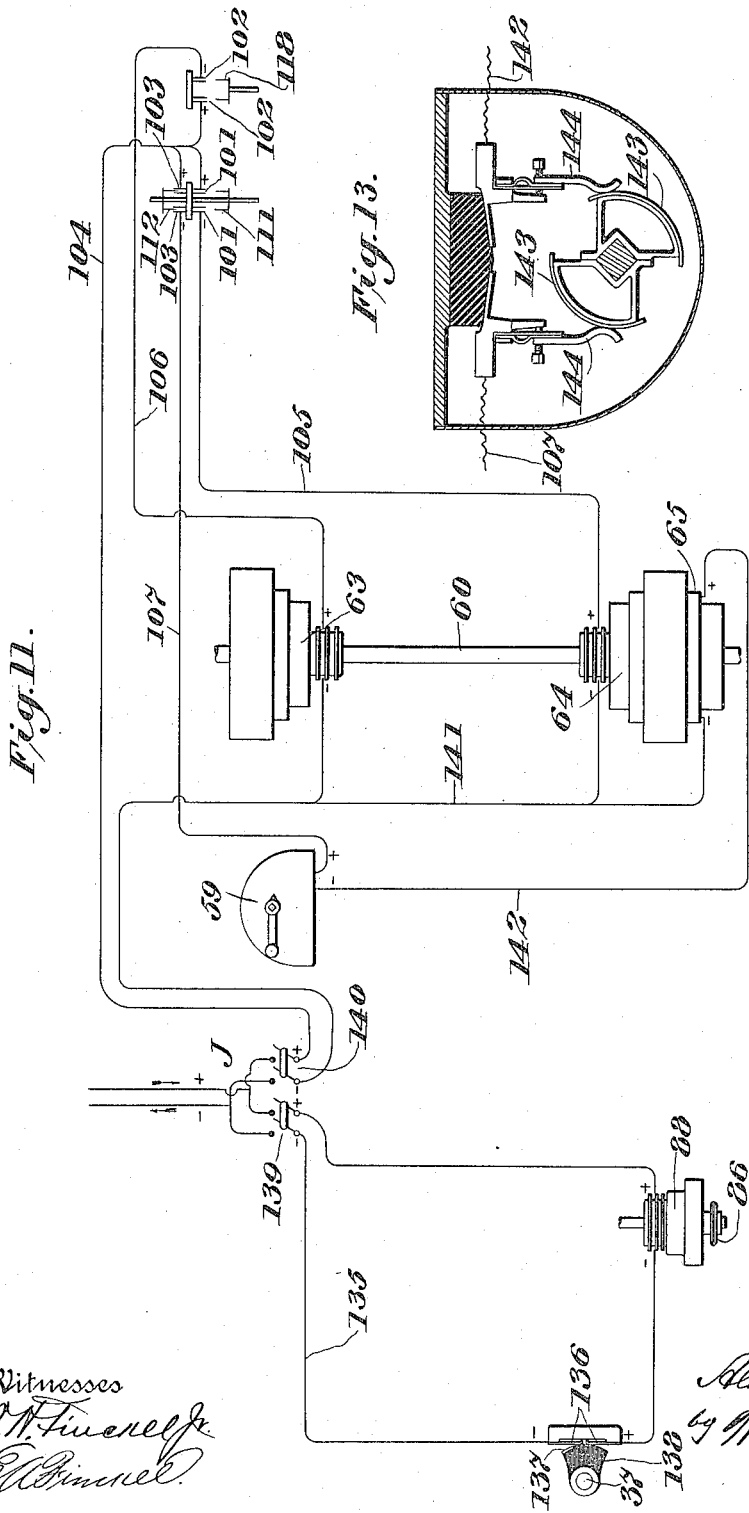

UNITED STATES PATENT OFFICE.

ALVIN D. WELKER, OF WADSWORTH, OHIO, ASSIGNOR TO THE OHIO MATCH COMPANY, OF WADSWORTH, OHIO, A CORPORATION OF OHIO.

DRIVE FOR MATCH-MACHINES.

1,158,410.　　　　　Specification of Letters Patent.　　　Patented Oct. 26, 1915.

Application filed January 18, 1915. Serial No. 2,975.

*To all whom it may concern:*

Be it known that I, ALVIN D. WELKER, a citizen of the United States, residing at Wadsworth, in the county of Medina and State of Ohio, have invented a certain new and useful Improvement in Drives for Match-Machines, of which the following is a full, clear, and exact description.

The object of this invention is to provide a flexible drive or operating mechanism for continuous match machines, so that the operation of various units may be controlled independently, and more particularly so that the splint cutting and setting mechanism and the endless chain of plates in which the splints are set or stuck, may be so controlled that when the cutting and setting machine is at rest, the endless chain of plates may continue to move so as to carry their load of matches through the machine to the discharge mechanism or punch-out.

Another object of the invention is to provide means for raising the endless chain of plates out of operative relation to the composition roll whenever necessary.

Another object of the invention is to provide for instantly arresting the movement of the chain of plates when desired, thereby eliminating a fruitful source of waste of matches where the endless chain is carried forward by its momentum when its drive is stopped.

Another object of the invention is to provide means for continuing the operation of the rolls in the composition applying mechanism to keep the composition agitated when the movement of the chain of plates is arrested and the chain of plates is moved out of operative relation to the composition applying roll.

The invention consists in an electrically controlled driving or operating mechanism for continuous match machines by which these and other objects of the invention are attained, as I will proceed now to explain and finally claim.

In the accompanying drawings illustrating the invention, in the several figures of which like parts are similarly designated, Figure 1 is a side elevation showing the invention applied to a continuous match machine. Fig. 2 is a fragmentary top plan view of parts shown in Fig. 1. Fig. 3 is an elevation and partial vertical section illustrating the air-lift and its associated parts for operating the endless chain carrying frame relatively to the composition roll. Fig. 4 is a side elevation; Fig. 5 is an end elevation and Fig. 6 is a top plan view of the air-lift detached. Fig. 7 is a side elevation of the combined electric and air switch, with the switch box in vertical section, and Fig. 8 is an end elevation with the interior of the switch box exposed and the air-valve casing and one of the friction stops broken away. Fig. 9 is a sectional detail of the connections between the slides and levers shown in Figs. 7 and 8. Fig. 10 is a perspective view of the air-valve and part of its lever or handle. Fig. 11 is a diagram illustrating the electrical connections. Fig. 12 is an elevation of the electric and air switch with its levers in the running position. Fig. 13 is a horizontal section of the controller. Fig. 14 is a vertical section of the chain-driving pulley and means to synchronize the movements of the endless chain and the cutting head. Fig. 15 is a cross-section on line A B, Fig. 14.

The unit or machine A for cutting the splints or sticks from blocks of wood and setting or sticking them in the endless chain of plates B, and the match discharge or punch-out C, may be and are here shown as of usual or approved construction. For purposes of this invention, this cutting and sticking or setting machine or cutting head, as it is commonly called, has a shaft 1 on one end of which is its driving pulley 2, and on the other end of which is the endless chain driving-pulley 3, either or both of which pulleys may be made effective by the drive or operating mechanism of this invention. 4 is a parallel shaft driven from the shaft 1, in any suitable way, as by gears 5, 6, 7 and 8, in accordance with the desired speed ratio. Above the shaft 4 is a parallel shaft 9 driven from it, as by gears 10 and 11, and at the opposite end of the shaft 9 is a vertical shaft 12, operatively connected with it, as by bevel or miter gears 13, and this vertical shaft is connected by bevel or miter gears 14 with an overhead horizontal shaft 15 running back to the composition applying unit or machine D. The shafts 12 and 15 are connected with and supported by the frame of the match machine by means of a bracket 16, or other device.

The chain B passes from the cutting and setting machine A along suitable ways 17 to the paraffining tank 18 of usual or approved construction, and thence to the composition machine D where the ignition composition is applied to the sticks.

As shown in Fig. 3 this composition machine D may comprise a heated chest 19 containing the rolls 20 and 21, and a supporting frame 22 having at its top a horizontal continuation 23 of the track 17 for the chain of plates. On the frame is supported a horizontal shaft 24 to which are pivoted the longitudinal members 25 and 26 of a frame E, which frame carries the chain of plates over and past the composition machine and which frame is capable of moving the chain relatively to the composition machine in such way that the match sticks will be brought into composition-applying relation to the roll 21 and also raised out of such relation, as illustrated by full and dotted lines, respectively, in Fig. 3. 27 and 28 are chain supporting tracks connected with the frame members 25 and 26 by brackets 29 and 30, respectively. At its outer end the frame carries the polygonal wheels or drums 31 and 32 on a shaft 33, which support the endless chain. From this frame the chain rises to a pair of large wheels 34, whence it progresses to the usual drying machine, not shown, or, if tipped matches are to be made, the chain may go to a similar frame at a second composition-applying machine, and thence to the drier, and thence to the punch-out.

The frame E has rollers 35 applied to its sides near the composition chest, and these rollers are engaged by cam arms 36 mounted upon a horizontal rock shaft 37 which is supported in the frame 22. Motion is imparted to the rock shaft and its cam arms so as to raise and lower the frame E by engagement of the cam arms with the rollers 35, by means of the air-lift F, herein referred to and which will be described now.

The air lift F comprises a cylinder 38 having air connections 39 and 40 at top and bottom, respectively, and an interposed piston 41, which has its rod 42 extended through a stuffing-box 43 and supplied at its end with a toothed rack-bar 44, which is backed up and held against displacement by a roller 45. Engaging this rack-bar is a toothed segment 46 fixed on the rock-shaft 37, so that by movement of the piston 41 the rack-bar actuates the toothed segment 46 which in turn rocks shaft 37, thereby turning the cam arms 36 and raising or lowering the frame E. Air for operating the air lift is supplied through pipes 47 and 48 which are connected with mains 49 and 50, respectively, leading to the air and electric switch G, which is supplied with compressed air or other motive fluid from any source, through pipe 51.

As shown in detail in Figs. 7 and 8, the switch G comprises a frame 52 provided with a valve casing 53, and to this casing are connected the air mains 49 and 50 and supply pipe 51, and an exhaust pipe 54. Communication between these pipes is established and broken by the operation of the three-way air-valve 55 arranged in the valve casing 53. This valve is provided with a lever 56 which may be and is here shown as made integral with the valve and is used to turn the valve so as to open communication between a source of supply of compressed air or other motive fluid, through pipe 51 and one or the other of the mains 49 and 50, so as to furnish pressure to the air cylinder 38 above or below the piston 41 in said cylinder, and exhaust the air from the opposite end. Figs. 7 and 8 show the switch G in position where the machine is at rest, while Figs. 1 and 2 show the parts in running position, and in this position the lever 56 would be turned as in Figs. 1 and 12, so that the air would enter the bottom of the air cylinder 38 and the exhaust would be connected with the top of the air cylinder. In this way and by this means the frame E may be lowered into the running position, full lines, Figs. 1 and 3, so that the endless chain of plates will pass over the composition roller and present the sticks in such relation thereto that the composition will be applied to form the striking heads thereon, and it may be raised to the dotted lines position, Fig. 3, to raise the sticks out of possible contact with the composition roll 21, as is necessary when the endless chain is stopped, for otherwise enormous heads of composition would be formed on the sticks and such matches would not be merchantable, and hence would be waste. If the stopping of the chain is only temporary, the composition rolls should continue to run so as to keep the composition properly agitated and the required layer of composition on the rolls, and this is provided for by the present invention as will presently appear.

In the process of making matches, it is necessary to have a source of drive, such as the motor 57, capable of delivering power to two places on the cutting and setting machine A, as at the cutting head drive pulley 2 and the chain drive pulley 3, and also to a third place, as at sprocket 58, presently referred to. The motor here shown and preferred, is a variable speed electric motor, controlled by an electric controller 59. This motor is back-geared to a countershaft 60 through spur gears 61 and 62. On this countershaft are mounted the right hand electric clutch 63, the left hand electric clutch 64, the electric brake 65, and sprocket wheel 66, and the shaft is supported in bearings 67 and 68. The pulley member of clutch 63 is connected to the drive pulley 2, and the pulley member of clutch 64 is connected to the chain drive pulley 3, by means of belts H and I respectively, or other suitable transmission devices. The sprocket 66 drives the sprocket 58 through the chain 69.

It is necessary for the proper operation of the cutting and setting machine that the relation of the drive between pulleys 2 and 3 should be such that pulley 2 drives only when pulley 3 is running, whereas pulley 3 may be driven when pulley 2 is at rest. In actual construction, the pulley 3 runs as an idler on the main shaft 1, and is provided with any suitable means for causing it to turn with the shaft and exactly in time with the pulley 2.

The gear 5 is fastened on the hub of the pulley 3, and hence the rotation of that pulley rotates the shaft 15 through the train of gearing previously described. From this shaft 15 power is taken off to drive various instrumentalities. As shown in Figs. 1 and 2, the shaft 15 is connected by miter gearing 70 with a transverse shaft 71, and this in turn is connected by gears 72 and 73 with a transverse shaft 74, and this shaft 74 is provided with a sprocket wheel 75 which is connected by a chain 76 with a sprocket 77 on the shaft 24. This shaft 24 is provided with rack gears 78 which engage the usual rack teeth on the chain of plates, as indicated in Fig. 3, to impart endless traveling motion to the chain of plates. On this shaft 24 in another sprocket 79 which is connected by chain 80 with a sprocket 81 on the shaft 82 of the composition roll 20. The sprocket 81 may be an idler on shaft 82, and provided with a pawl engaging a wide-face ratchet 83 fast on the shaft to cause said shaft and sprocket to turn together. Shaft 82 may also be provided with an idler sprocket 84, likewise equipped with a pawl to engage the wide-face ratchet 83; and this sprocket 84 may be connected by a chain 85 with the sprocket 86 on the shaft 87, and this shaft 87 may have a drive independent of shaft 15, as will now be described.

The sprocket 86 is part of an electric clutch 88, which is mounted on shaft 87, and this shaft is driven through miter gears 89 from shaft 90, and this shaft 90 receives its motion through miter gears 91 from shaft 92, and shaft 92 is driven from shaft 93 at a reduced speed by spur gears 94 and 95. On shaft 93 is the sprocket wheel 58 which is driven by the sprocket chain 69 from the sprocket wheel 66 on the countershaft 60.

The electrical installation for controlling the operation of the machine may be and preferably is as follows:—The switch G comprises a casing or box 96 within which are placed the cross-pieces 97 and 98, secured therein in any suitable way, as by screws 99 engaging ledges 100, and these cross-pieces may be of any suitable insulating material. On the cross-piece 97 are mounted the pairs of depending spring contact fingers 101 and 102, and from the cross-piece 98 rise a pair of spring contact fingers 103. The fingers 101 are connected with the feed wire 104 (see Fig. 11) and with the left hand clutch 64 by wire 105; the fingers 102 are connected with the feed wire 104 and with the right hand clutch 63 by wire 106; and the fingers 103 are connected with the feed wire 104 and with the brake 65 through the controller 59 by wire 107. A slide 108 is mounted in the casing 96 and has fixed to it the bars 109 and 110 below and above the cross-pieces 97 and 98 and in line with the fingers 101 and 103, and on these bars are the knives 111 and 112 adapted to coöperate with the fingers 101 and 103, respectively, to make and break the respective circuits alternately. Each pair of knives is insulated from the bar in any suitable way, as by insulating sleeves 113, and the two knives of each pair are electrically connected, as by wires 114, shown in Fig. 7 as applied to the knives 112, a similar wire being applied to the knives 111. The slide 108 projects through the bottom of the box 96, and its lower end is supplied with a roller 115 which engages a cam-slot 116 in an arcuate or segmental extension 117 of the lever 56 of the air valve, so that by turning said lever with the valve as an axis, the slide will be moved up and down to bring the knives 112 in contact with the fingers 103 as shown in Figs. 7 and 8, and disconnect the knives 111 from the fingers 101, or vice versa, as it is desired to utilize one or the other of the circuits described.

The fingers 102 have their coöperating knives 118 mounted upon a bar 119 and insulated therefrom, and electrically connected by a wire 120; and this bar 119 is mounted upon a slide 121 likewise extending out of the bottom of the box 96, and having a roller 122 on its lower end which engages a cam-slot 123 in an arcuate or segmental extension 124 of a secondary lever 125 and pivoted coaxially with the lever 56. This lever 125 has a handle 126 by which it may be operated independently of the lever 56, and it also has a stop-lug or pin 127 by which it may be compelled to move contra-clockwise with the lever 56.

The levers 56 and 125 are arranged on opposite sides of a sector 128, and they are provided with the spring-pressed pins 129, 130, respectively, which frictionally engage the sector to hold the levers jointly or severally in given position. These pins and their respective springs 131, 132, are arranged in retainers 133, 134, respectively, carried by the respective levers.

It will be understood that when the lever 56 is turned so as to operate the valve and the air cylinder, it will also simultaneously operate the knives attached to the slide 108 which is connected with said lever as stated. The lever 125 may be operated or restrained from operation by its handle 126 independently of the lever 56, excepting that when said levers are both moved clockwise as indicated in Fig. 12, any contra-clockwise movement of the lever 56 compels similar movement of lever 125 by the obtrusion of its pin 127. When both levers 56 and 125 are in their vertical position, then it is impossible to move lever 125 clockwise unless lever 56 is first moved in the same direction.

J represents a switch-board, and this board in addition to being connected with the feed wire and other wires previously described, is connected by a wire 135 with the spring fingers 136 located at the composition chest, and the circuit between these fingers is completed by means of a contact piece 137 mounted on an insulated segmental block 138 made fast on the shaft 37. Thence the wire continues to the electric clutch 88, and thence back to the switch-board.

A direct current is admitted through the feed wire 104 to the double pole knife switches 139 and 140 in the switch-board J. Through switch 139 the current is supplied to the electric clutch 88 and controlled by contact points 136 and contact piece 137 of segmental block 138. Switch 140 supplies current to the right hand electric clutch 63, the left hand electric clutch 64 and the electric brake 65. Current passes from the positive side of switch 140 through the feed wire 104 to the three positive fingers in the switch box, and thence into the blades through their connecting wires to the negative fingers; and from the appropriate depending negative finger the current is conducted by wire 105 to the left hand electric clutch 64 and thence through wire 141 to the negative side of switch 140. From the upright negative finger 103 current is conducted by wire 107 to the controller 59, and thence through wire 142 to the electric brake 65, and thence by wire 141 to the negative side of switch 140. From the negative finger 102 current is conducted by the wire 106 to the right hand electric clutch 63, and thence by wire 141 to the negative side of the switch 140.

The controller 59 is of the ordinary type for a variable speed motor, excepting that I have added an extra pair of segments 143, Fig. 13, and two contact fingers 144, and these fingers are placed in the controller in such way that they touch the segments 143 when the controller is in the running position, and are out of contact with it when the controller is in the off position, thus allowing the circuit through wires 107 and 142 to be open when the motor is at rest. The object in having the circuit pass through the controller is to insure that no current passes through the electric brake when the motor is at rest, which otherwise would be possible, since the brake switch in the switch box is closed when the motor is at rest.

The electric clutches and the brake are of substantially standard type, but adapted to the use of this particular match machine.

The clutches 63 and 64 are incorporated in a pulley drive, while the clutch 88 is connected in a sprocket wheel drive.

The right hand clutch wires 104 and 106 enter the switch casing through conduit 145, and the left hand clutch wires 104 and 105 through conduit 146, and the brake wires 141 and 142 through the conduit 147.

In order to synchronize the movements of the endless chain and the cutting head, the pulley 3 may be connected with the shaft 1 to turn with it at a predetermined instant or to run loose upon it, by any suitable means, such, for example, as that shown in Figs. 14 and 15. A disk or collar 148 turning with the shaft, has fastened to it a ring 149, as by screws 150, and this ring has the holes 151 and 152 in it arranged out of line. As shown, the hole 152 is a little to the left of a diametrical line drawn vertically through the axis of the shaft, and between this ring and the pulley is the gear wheel 5 similarly pierced transversely, as is the pulley 3, and fixed to the pulley, as by screws 153, to turn with it. The hub of the pulley is extended outwardly, as at 154 and upon this hub-extension is mounted a flanged collar 155 carrying the pins 156 and 157 likewise arranged out of diametrical line and extending through the holes in the pulley and gear wheel and adapted to engage the holes in the ring 149. The flanged collar is supplied with a ring 158 let into it but free to turn on it, and to this ring is swiveled a yoke 159 adapted to be engaged by a lever 160 or other means to move the flanged collar toward and from the pulley and thereby cause its pins to engage with the holes in the ring 149 and to be disengaged therefrom.

When it is desired to have the pulley 3 run with the shaft 1, the collar 155 is moved endwise toward the pulley so that its pins will enter the holes 151 and 152 of ring 149. The fact that these holes as well as the pins are not located diametrically opposite each other but to one side, makes it possible to have just the one point at which the pulley may be engaged with the shaft, and thereby insures the same definite relative movements of the cutting head and the endless chain.

In the operation of a continuous match machine, it is necessary to have a drive that is flexible, so that one part, unit, or machine may operate independently of or in connection with another. In the present invention, this necessity is provided for in the incorporation in the machine of the variable speed motor 57 and its connection with the countershaft 60. This necessity arises from the fact that when the splints are being stuck or set in the plates of the endless chain of plates both the cutting machine drive and the chain drive must be running; but at the end of a running period the cutting machine drive may be stopped, while the chain drive may continue to run until all of the matches in the plates have been ejected therefrom. It takes about an hour for the endless chain to pass a given point in the standard size of continuous match machines of the type herein referred to.

To operate the machine, the motor 57 is started at the controller 59 which motor turns shaft 60. The clutches 63 and 64 not being energized, the pulleys 2 and 3 remain at rest. At this time the control switch G is in the position shown in Figs. 7 and 8, and the pulleys 2 and 3 may be started separately, as follows:—By moving the lever 56 clockwise through an angle of about ninety degrees, as shown in Fig. 12, but while lever 125 is at rest in the vertical position, Figs. 7 and 8, an electric circuit is completed through the contact blades 111, fingers 101 and wires 105 and 141, thus energizing the clutch 64, which starts the pulley 3 and operates the chain drive. After this the cutting machine is set in motion by moving the lever 125 clockwise through an angle of about ninety degrees as shown in Figs. 12, to thereby complete a circuit through blades 118, fingers 102, and the wires 106 and 141, thus energizing the clutch 63, which starts pulley 2 of the cutting machine. After having started the pulleys 2 and 3 as described above, they may be stopped either independently or both at the same time. In order to stop them independently, it is necessary to stop pulley 2 first by moving the operating lever 125 from the position shown in Figs. 1 and 12 in a contra-clockwise direction into its vertical position, as shown in Figs. 7 and 8; and then pulley 3 may be stopped likewise by moving its controlling lever 56 in the same contra-clockwise direction into the vertical position. It is at this point that the electric brake 65 is operated to stop the movement of the clutch pulley 64. At the same instant that the circuit through wires 105 and 141 is opened, the circuit through wires 107 and 142 is closed. When the circuit through wires 105 and 141 is opened, the left hand clutch 64 ceases to be effective, while the closing of the circuit through wires 106 and 141 energizes the brake 65, causing pulley 3 to stop immediately and arresting the momentum that would otherwise continue to cause the pulley to turn. The action of this electric clutch 64 and brake 65 is made possible by the fact that the operating switch blades 111 are mounted inversely on the slide 108. When this slide 108 is moved in the upward direction, the clutch switch is closed and the brake switch is opened, and vice versa.

The pin 127 fastened to the lever 125 makes it possible to operate the two levers separately only in the order above stated; that is to say, to start the pulleys separately the lever 56 must be operated before lever 125, while to stop the pulleys separately, the lever 125 is operated before the lever 56. If it be desired to start both pulleys 2 and 3 at the same time, then the lever 125 is operated clockwise to its horizontal position (Figs. 1 and 12) first, and the pin 127 engaging the edge of the lever 56 carries said lever along with the lever 125. Then in stopping, the lever 56 is operated first, and by virtue of the pin 127, the lever 125 is carried along with it. The pin 127 makes it impossible to start the cutting head pulley 2 unless the chain drive pulley 3 has first been started, while in stopping the chain drive pulley 3 would not be stopped unless the cutting head pulley 2 is first stopped, or both of them stopped together. This is made necessary by the fact that a wreck of the match machine would be caused if the chain were not running to receive the match splints which would be cut by the operation of the cutting head or machine. After both the chain drive pulley 3 and the cutting head drive pulley 2 have been started by means already described, there is a chance of a greater belt slip on one drive than on the other, thus throwing the movement of the chain a little out of time with respect to the cutting head. This may be overcome, when running two drives together, by various means, such as that shown in Figs. 14 and 15 and previously described. This will allow both pulleys to drive on shaft 1 as a unit, and when the machine is stopped the electric brake 65 is utilized to overcome the momentum of the cutting head as well as that of the chain; in fact, it is the momentum of the cutting head that tends to advance the chain.

Referring now to the air-lift and its electrical relations, it is to be noted that when the frame E is in its lowered position, Figs. 1 and 3, full lines, the depending ends of the match splints in the plates of the endless chain are in position to receive the proper quantity of composition from the composition roll 21. When the frame, however, is in its elevated position, dotted lines Fig. 3, the depending match splints are raised sufficiently far above the composition roll to be free of it, and consequently are not headed. When the cutting machine drive pulley 2 and the chain drive pulley 3 are at rest during any time in the operating period, it is necessary that the composition in the chest 19 be agitated, and this is accomplished by power received from sprocket 66 on shaft 60 connected with sprocket 58 on shaft 93, and then transferred through various gears and shafts to electric clutch 88, and thence through the sprockets 86 and 84 and the connecting chain 85. The clutch 88 only operates when the circuit through wire 135 is closed, which occurs when fingers 136 are connected by the contact piece 137 on the segmental block 138. This occurs only when the frame E is in its elevated position, and as already stated, the frame rises into its elevated position only when the chain drive pulley 3 is at rest, and this is made possible by the peculiar construction of the combined air and electric switch G.

When the chain drive is started by means of lever 56 operating the electric switch, the position of the ports in the valve is such that air passes from the supply pipe 51 through the valve and thence through pipe 50 to the lower chamber of the air cylinder, which causes the piston to move up and at the same time the air above the piston is exhausted through the pipe 49, the valve ports and the exhaust pipe 54. When the piston moves up the frame E moves to its down position owing to the fact that the cam arms 36 (which engage with the cam rolls 35 on the frame) and the segment 46 are keyed to the same shaft 37.

The object in raising the frame when the match chain drive is at rest is, as already indicated, to remove depending match splints from proximity to the composition roll at the instant the movement of the match chain and composition roll ceases. It is at this point that the action of the electric brake 65 becomes effective. Without the use of this brake, it will be found that when the frame is elevated the tendency of the endless chain of plates is to advance several inches, due to the momentum of the several rotating parts, and such advance would carry a number of rows of match splints past the point of dipping and thereby this number of rows of match splints would be without heads, because the frame has been moved up and carried the splints out of contact with the composition roll. By the apparatus herein described, this momentum advance is obviated, and hence a waste of match splints avoided.

Obviously, the invention is not limited to the use of a single composition chest, but two or more such chests and their adjuncts may be incorporated in the machine by extending the air lines to other similar air lifts similarly located and by the addition of similar driving mechanisms similarly located and operated, as suggested by the broken off air lines and shafting at the left hand end of Fig. 1. So also other variations in the construction and arrangement of the parts are within the principle and claims of the invention.

What I claim is:—

1. In a match machine, an endless chain in which the splints are stuck or set, means to move said chain through the machine, a composition-applying mechanism, a frame over which the chain passes mounted over the composition mechanism, means to raise and lower said frame so as respectively to move the matches out of and into operative relation with respect to the composition mechanism, means rendered operative by the raising of the frame to effect the continued motion of the composition mechanism, and a central control apparatus for these several parts.

2. In a match machine, an endless chain in which the splints are stuck or set, means to move said chain through the machine, a composition-applying mechanism, a frame over which the chain passes mounted over the composition mechanism, an air-lift for raising and lowering the frame relatively to the composition mechanism, a primary and a secondary drive for the composition mechanism, said secondary drive rendered operative by the raising of the frame, and a central control apparatus for the chain moving means and the air-lift.

3. In a match machine, an endless chain in which the splints are stuck or set, means to move said chain through the machine, a composition-applying mechanism, a frame pivotally mounted over the composition applying mechanism and upon which frame the chain is movably supported, a lifting mechanism for raising and lowering the frame relatively to the composition mechanism, a main drive and a secondary drive for the composition mechanism, and a central control apparatus for simultaneously arresting the travel of the match chain and rendering the lifting mechanism operative to raise the frame and energizing the secondary drive.

4. In a match machine, an endless chain in which the splints are stuck or set, means to move said chain through the machine, a composition-applying mechanism, a frame movably mounted over the composition-applying mechanism and upon which frame the chain is supported, a lifting mechanism for raising and lowering the frame relatively to the composition mechanism so as respectively to lift the splints out of and lower them into position to receive the composition from the composition mechanism, a central control apparatus for simultaneously arresting the travel of the match chain and rendering the lifting mechanism operative to raise the frame, and means interposed between the lifting mechanism and the frame and rendered active by the lifting of the frame to continue the operation of the composition-applying mechanism so as to keep the composition agitated.

5. In a match machine, an endless chain in which the splints are stuck or set, means to move said chain through the machine, a composition-applying mechanism, a frame movably mounted over the composition-applying mechanism and upon which frame the chain is supported, an air-lift for raising and lowering the frame relatively to the composition mechanism respectively to move the match splints out of composition-applying relation to the composition mechanism and present them to such mechanism for application of the composition, a combined air and electric switch and electric and air connections between said switch and said chain, composition-applying mechanism and frame by means of which the relative movements of these several parts may be controlled.

6. In a match machine, an endless chain in which the splints are stuck or set, means to drive said chain through the machine, a composition - applying mechanism, a frame over which the chain passes mounted over the composition mechanism, an air-lift for raising and lowering the frame relatively to the composition mechanism, means for simultaneously arresting the travel of the match chain and rendering the air-lift operative to raise the frame, a secondary drive for the composition mechanism, and an electric circuit including said secondary drive, and a circuit closer operated in conjunction with the air-lift to render said circuit operative to put the secondary drive in operation when the chain drive is at rest.

7. In a match machine, a splint cutting and setting unit, a coöperating endless chain of plates in which the splints are stuck, independent drives for the cutting unit and for the endless chain of plates, independent starting and stopping mechanisms for said drives, electric circuits including said starting and stopping mechanisms, and an electric switch for controlling said circuits, so that they may be operated independently to start one drive after another and to stop the cutting unit without stopping the chain drive.

8. In a match machine, the combination of a cutting unit and an endless chain unit, each having its own independent driving mechanism, an electric motor, means connecting said electric motor independently with the cutting unit and the chain unit, including electric circuits, an electric switch through which said circuits extend, and means for compelling the simultaneous operation of certain circuits for effecting the starting and stopping of the cutting unit and the chain unit and for permitting the independent operation of the chain unit.

9. In a match machine, the combination of a cutting unit, an endless chain unit, including a movable frame, a composition chest over which the movable frame is arranged, an air-lift for raising and lowering said frame with relation to the composition chest, secondary means for keeping the composition in the chest agitated during the temporary suspension of the movement of the endless chain, electric circuits for controlling the movement of the cutting unit, the endless chain and the secondary means, and a combined air and circuit controlling switch by which the cutting unit, the endless chain and the secondary means as well as the air-lift may be controlled.

10. In a match machine, the combination with a cutting unit, an endless traveling chain unit, a composition-applying unit, and means to drive said units, of an electric motor, a countershaft driven from said motor, an electric clutch and means to connect it with the cutting unit, an electric clutch and means to connect it with the chain unit, an electric clutch and means to connect it with the composition-applying unit and constituting a secondary drive for the composition-applying unit, an electric circuit for each of the three clutches, and an electric switch adapted to simultaneously start the several units or to successively start the chain unit and then the cutting unit and to stop both of these last mentioned units and continue to drive the composition-applying unit through the secondary drive.

11. In a match machine, the combination with a cutting unit, an endless traveling chain unit, a composition-applying unit, and means to drive said units, of an electric motor, a countershaft driven from said motor, an electric clutch and means to connect it with the cutting unit, an electric clutch and means to connect it with the chain unit, an electric clutch and means to connect it with the composition-applying unit and constituting a secondary drive for the composition-applying unit, an electric circuit for each of the three clutches, an electric switch adapted to simultaneously start the several units or to successively start the chain unit and then the cutting unit and to stop both of these last mentioned units and continue to drive the composition-applying unit through the secondary drive, an electric brake interposed in the chain drive circuit, and means to automatically energize it when the chain drive circuit is closed to thereby effect the instant cessation of movement of the chain unit or drive.

12. In a match machine, a splint cutting and setting unit, a coöperating chain of plates in which the splints are stuck, independent drives for the cutting unit and for the endless chain of plates, independent starting and stopping mechanisms for said drives, a composition-applying mechanism, a frame movably arranged over the composition-applying mechanism and carrying the endless chain, an air-lift for moving the frame to carry the splints into and out of composition-receiving relation to the composition applying mechanism, a rock-shaft, a connection between said rock-shaft and the air-lift whereby the rock-shaft is actuated, means interposed between the rock-shaft and the frame to effect the raising and lowering of the frame, a secondary drive for the composition-applying mechanism, an electric circuit for energizing said drive, a circuit closer for said secondary drive operated by said rock-shaft, and a combined electric and air switch for simultaneously operating said cutting mechanism, endless chain, composition-applying mechanism, frame, and secondary drive.

13. In a match machine, a splint cutting and setting unit, a coöperating endless chain of plates, independent means for driving said unit and chain including a driving pulley for each, a shaft on which said pulleys are mounted, one of said pulleys being mounted loosely upon said shaft, means to cause said pulley to turn with said shaft at pleasure, and means to render said pulley-turning means effective to thereby synchronize the movements of the cutting unit drive and the chain drive.

14. In a match machine, a splint cutting and setting unit, a coöperating endless chain of plates, independent means for driving said unit and chain including a driving pulley for each, a shaft on which said pulleys are mounted, one of said pulleys being mounted loosely upon said shaft, means partly on and always moving with the pulley, complementary means on and always turning with the shaft, and connecting means for the two relatively disposed to insure connection of the pulley and shaft at a predetermined time and not otherwise to effect the coincident movement of the chain and cutting unit.

In testimony whereof I have hereunto set my hand this 16th day of Jan. A. D. 1915.

ALVIN D. WELKER.

Witnesses:
A. M. BECK,
E. E. SHRIE.

Copies of this patent may be obtained for five cents each, by addressing the "Commissioner of Patents, Washington, D. C."